(12) United States Patent
Yan et al.

(10) Patent No.: US 12,457,515 B2
(45) Date of Patent: Oct. 28, 2025

(54) SERVING CELL MEASUREMENTS IN IDLE MODE

(71) Applicant: Apple Inc., Cupertino, CA (US)

(72) Inventors: Hongbo Yan, Vista, CA (US); Amir Farajidana, Sunnyvale, CA (US); Christian Hofmann, Munich (DE); Dietmar Gradl, Ebersberg (DE)

(73) Assignee: Apple Inc., Cupertino, CA (US)

( * ) Notice: Subject to any disclaimer, the term of this patent is extended or adjusted under 35 U.S.C. 154(b) by 364 days.

(21) Appl. No.: 17/881,480

(22) Filed: Aug. 4, 2022

(65) Prior Publication Data

US 2023/0087707 A1     Mar. 23, 2023

Related U.S. Application Data

(60) Provisional application No. 63/247,413, filed on Sep. 23, 2021.

(51) Int. Cl.
*H04W 24/10*     (2009.01)
*H04B 7/08*     (2006.01)
*H04W 56/00*     (2009.01)
*H04W 76/28*     (2018.01)

(52) U.S. Cl.
CPC ............ *H04W 24/10* (2013.01); *H04B 7/088* (2013.01); *H04W 56/001* (2013.01); *H04W 76/28* (2018.02)

(58) Field of Classification Search
None
See application file for complete search history.

(56) References Cited

U.S. PATENT DOCUMENTS

| 2019/0150013 A1* | 5/2019 | Zhang | H04B 7/082 |
| | | | 375/224 |
| 2022/0038168 A1* | 2/2022 | Ma | H04B 7/088 |
| 2023/0087707 A1* | 3/2023 | Yan | H04W 76/28 |
| | | | 370/503 |
| 2023/0205730 A1* | 6/2023 | Zivkovic | G06F 15/7807 |
| | | | 712/3 |
| 2024/0220445 A1* | 7/2024 | Rajamani | H04L 25/03343 |

FOREIGN PATENT DOCUMENTS

WO    WO-2021101668 A1 *   5/2021        H04W 52/0248

OTHER PUBLICATIONS

"Power Consumption by UE in RRC IDLE/INACTIVE", Samsung, 3GPP TSG-RAN2 Meeting #111 Electronic, R2- 2006775, Aug. 17-28, 2020, 4 pages.
Application No. EP22193582.8, Extended European Search Report, Mailed on Feb. 23, 2023, 8 pages.

* cited by examiner

*Primary Examiner* — Christopher T Wyllie
(74) *Attorney, Agent, or Firm* — Kilpatrick Townsend & Stockton LLP

(57) ABSTRACT

The present application relates to scheduling SSB measurements on SSB beams. In an example, a base station can transmit SSBs on SSB beams that form a serving cell. Depending on an SSB measurement on one of the SSB beams, a UE can schedule an additional SSB measurement on this SSB beam only or schedule SSB measurements on the different SSB beams.

20 Claims, 13 Drawing Sheets

1000 ⬅

```
┌─────────────────────────────────────────────────────────────────┐
│ Receiving, , during a discontinuous reception (DRX) cycle, a first plurality of │
│ synchronization signal blocks (SSBs) that respectively correspond to a │
│ plurality of beams of a base station 1002 │
└─────────────────────────────────────────────────────────────────┘
                                  │
                                  ▼
┌─────────────────────────────────────────────────────────────────┐
│ Selecting a first beam of the plurality of beams based on a first │
│ measurement that corresponds to a first SSB of the first plurality of SSBs, │
│ the first SSB received on the first beam 1004 │
└─────────────────────────────────────────────────────────────────┘
                                  │
                                  ▼
┌─────────────────────────────────────────────────────────────────┐
│ Comparing the first measurement to a measurement threshold 1006 │
└─────────────────────────────────────────────────────────────────┘
                                  │
                                  ▼
┌─────────────────────────────────────────────────────────────────┐
│ Scheduling, based on said comparing, either (i) a second measurement │
│ that corresponds to a second SSB to be received on the first beam, or (ii) │
│ an SSB search and measurement per beam of the plurality of beams 1008 │
└─────────────────────────────────────────────────────────────────┘
```

FIG. 10

SERVING CELL MEASUREMENTS IN IDLE MODE

CROSS-REFERENCES TO RELATED APPLICATION

This application claims the benefit of U.S. Provisional Patent Application No. 63/247,413, filed on Sep. 23, 2021, which is herein incorporated by reference in its entirety for all purposes.

BACKGROUND

Fifth generation mobile network (5G) is a wireless standard that aims to improve upon data transmission speed, reliability, availability, and more. This standard, while still developing, includes numerous details relating to cell selection/reselection, where, for instance, a user equipment (UE) can communicate with a network to send and receive data. The UE can operate in a discontinuous reception (DRX) mode to reduce its power consumption, whereby the UE can deactivate some of its transmission and/or reception components for a certain period of time during, which no data communication occurs.

BRIEF DESCRIPTION OF THE DRAWINGS

FIG. 10 illustrates an overall example of an operational flow/algorithmic structure for scheduling SSB measurements, in accordance with some embodiments.

DETAILED DESCRIPTION

Figure 1:
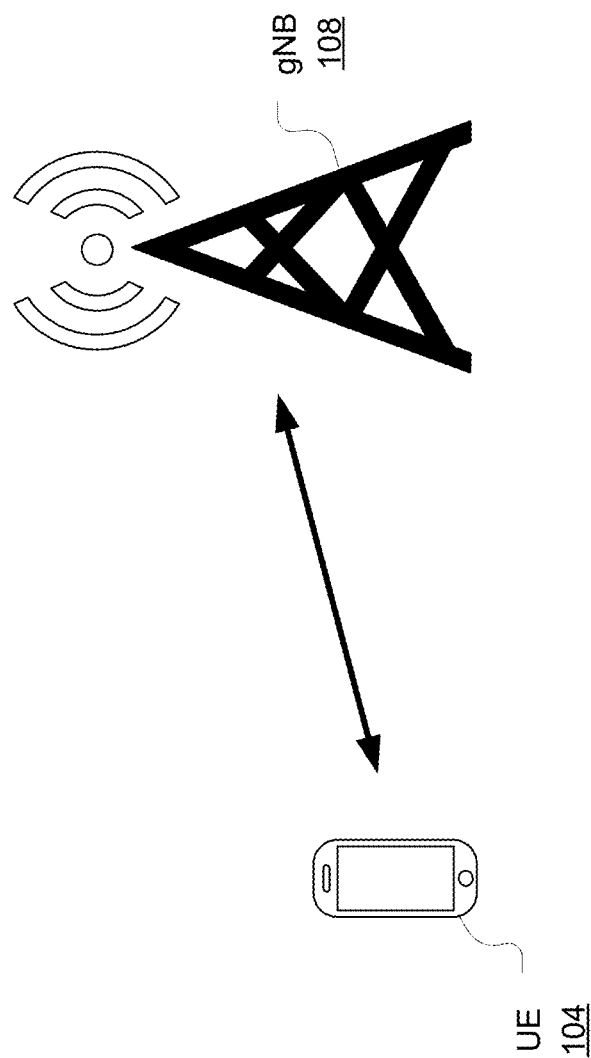
FIG. 1 illustrates an example of a network environment, in accordance with some embodiments.

The following detailed description refers to the accompanying drawings. The same reference numbers may be used in different drawings to identify the same or similar elements. In the following description, for purposes of explanation and not limitation, specific details are set forth, such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, a user equipment (UE) can communicate with a network, such as with one or more base stations or other network nodes. To improve the UE's power consumption, the UE can be configured for using discontinuous reception (DRX). During a DRX cycle, the UE can operate in an idle mode and may wake up periodically to receive reference signals, such as synchronization signal (SS)/PBCH blocks (SSBs). SSBs can be sent on multiple SSB beams and can be used for, for example, beam selection and/or cell reselection.

Rather than having to perform measurements on all received SSBs, the UE can determine whether an SSB measurement on a currently-selected SSB beam is sufficient to indicate a strong-selected beam. If so, an SSB measurement on that SSB beam is scheduled. Otherwise, SSB search and measurement can be scheduled across the different SSB beams. In an example, the SSB measurement can be any or a combination of a signal-to-interference and noise ratio (SINR) measurement, a reference signal received power (RSRP) measurement, or a reference signal received quality (RSRQ). In this example, the SSB measurement can be compared to a measurement threshold (e.g., any or a combination of a predefined SINR value, a predefined RSRP value, or a predefined RSRQ value). If the SSB measurement exceeds the measurement threshold, the UE can determine if the currently selected SSB beam is strong enough, thereby avoiding the scheduling of an SSB search and measurement per SSB beam. Doing so can further reduce the power consumption of the UE because, during the DRX cycle, the UE may remain sleeping for a relatively longer time.

The following is a glossary of terms that may be used in this disclosure.

The term "circuitry" as used herein refers to, is part of, or includes hardware components, such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or digital signal processors (DSPs) that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities that is a network node of a communications network (or, more briefly, network) and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services and may include computing or network resources. System resources may be considered as a set of coherent functions, network data objects, or services accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like, as used herein, refer to the creation of an instance. An "instance" also refers to a concrete occurrence of an object, which may occur, for example, during execution of program code.

The term "connected" may mean that two or more elements at a common communication protocol layer have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element or a data element that contains content. An information element may include one or more additional information elements.

FIG. 1 illustrates a network environment 100, in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications, such as those that define Fifth Generation (5G) NR system standards.

The gNB 108 may transmit information (for example, data and control signaling) in the downlink direction by mapping logical channels on the transport channels and transport channels onto physical channels. The logical channels may transfer data between a radio link control (RLC) and MAC layers; the transport channels may transfer data between the MAC and PHY layers; and the physical channels may transfer information across the air interface. The physical channels may include a physical broadcast channel (PBCH), a physical downlink control channel (PDCCH), and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in an SSB. The SSBs may be used by the UE 104 during a cell search procedure (including cell selection and reselection) and for beam selection.

The PDSCH may be used to transfer end-user application data, signaling radio bearer (SRB) messages, system information messages (other than, for example, MIB), and SIs.

The PDCCH may transfer DCI that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel status information reference signals (CSI-RS). The CSI-RS may be a multi-purpose downlink transmission that may be used for CSI reporting, beam management, connected mode mobility, radio link failure detection, beam failure detection and recovery, and fine-tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain, and one OFDM symbol in the time domain, for example, twelve resource elements. A control channel element (CCE) may represent a group of resources used to transmit PDCCH. One CCE may be mapped to a number of REGs (for example, six REGs).

The UE 104 may transmit data and control information to the gNB 108 using physical uplink channels. Different types of physical uplink channels are possible including, for instance, a physical uplink control channel (PUCCH) and a physical uplink shared channel (PUSCH). Whereas the PUCCH carries control information from the UE 104 to the gNB 108, such as uplink control information (UCI), the PUSCH carries data traffic (e.g., end-user application data), and can carry UCI.

The UE 104 and the gNB 108 may perform beam management operations to identify and maintain desired beams for transmission in the uplink and downlink directions. The beam management may be applied to both PDSCH and PDCCH in the downlink direction, and PUSCH and PUCCH in the uplink direction.

In an example, communications with the gNB 108 and/or the base station can use channels in the frequency range 1 (FR1), frequency range 2 (FR2), and/or a higher frequency range (FRH). The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device should apply a clear channel assessment (CCA) check before using the channel.

To improve the UE's 104 power consumption, the UE 104 can operate in an idle mode. In support of the idle mode, the UE 104 may perform multiple mechanisms. One mechanism relates to SI acquisition. In particular, the UE 104 stays, during the idle mode, in a sleep mode (e.g., a sleep state or de-active state) of a DRX cycle and periodically wakes up (e.g., a wake state or an active state) to acquire SI.

Figure 2:
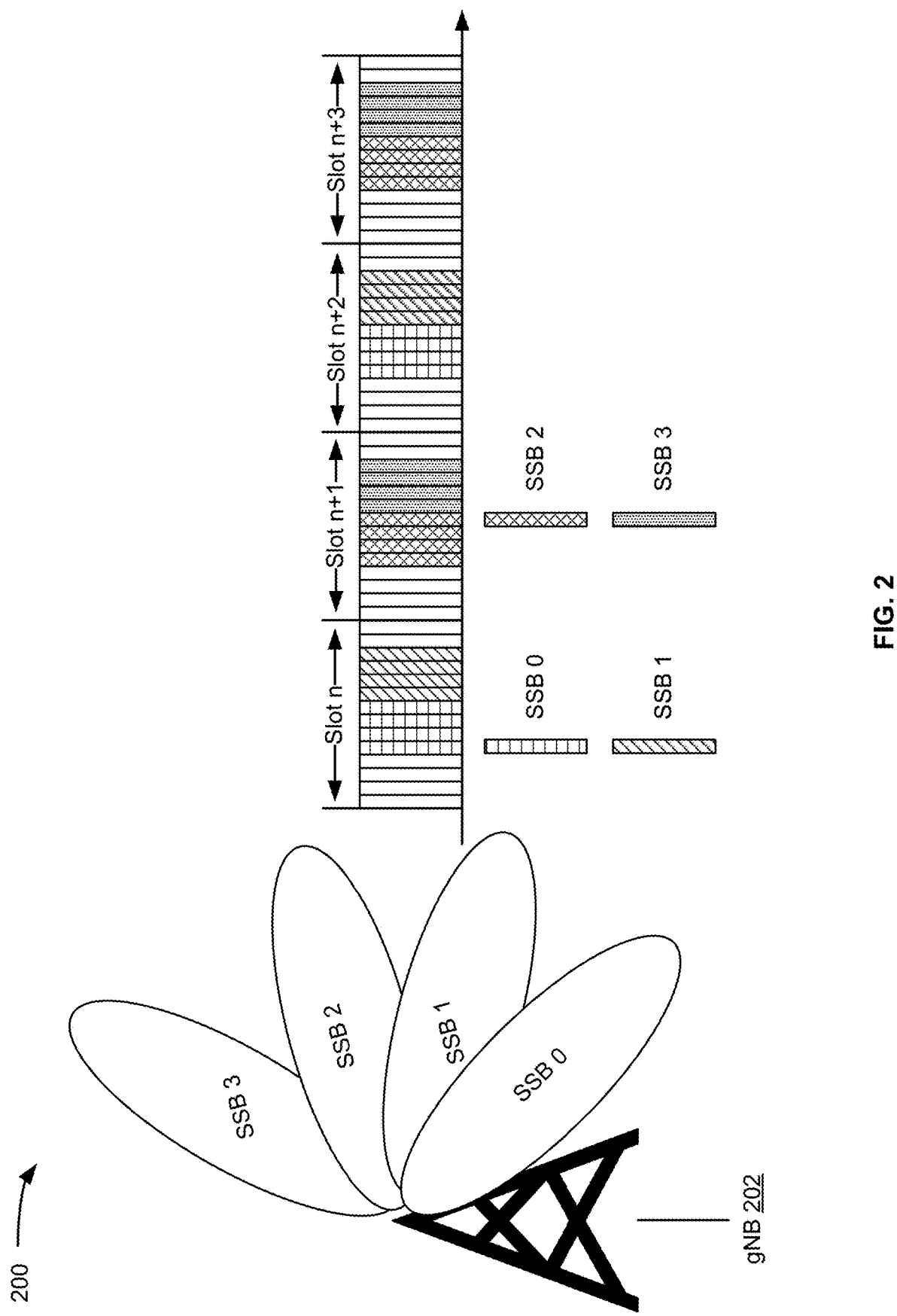
FIG. 2 illustrates an example of synchronization signal block (SSB) beams and related SSBs, in accordance with some embodiments.

FIG. 2 illustrates an example 200 of SSB beams and related SSBs, in accordance with some embodiments. The SSB beams are illustrated on the left hand side as being used by a gNB 202 for transmission of SSBs. The SSBs are sent over the SSB beams and are illustrated on the right hand side.

Generally, the gNB 202 can transmit multiple SSBs in a burst set period, with each SSB potentially in a different beam. These beams are referred to herein as SSB beams (e.g., an analog beam dedicated to a specific SSB). A UE performs beam sweeping to select one or more SSB beams (e.g., an SSB beam that has the best SSB measurement among the SSB beams, where these measurements are performed on the detected SSBs) for communication with the gNB 202.

In the illustration of FIG. 2, the gNB 202 performs beam sweeping to transmit the SSB beams at predefined directions in a burst within a regular interval. These SSB beams are indexed with SSB beam indexes "i" (shown in FIG. 2 as "i" equal to "0," "1," "2", "3"). An SSB caries the PSS, the SSS, and the PBCH and is repeated in the SSB beams in a burst, and this SSB burst is repeated periodically. A cell can be covered by up to four SSB beams for a sub-3 GHz carrier and up to eight SSB beams for a carrier with a 3 to 7 GHz range.

As shown in the right hand side of FIG. 2, an SSB occupies multiple symbols in a slot (FIG. 2 shows each SSB occupying four symbols in a slot as an illustrative example). Further, the SSBs over different SSB beams can be transmitted back-to-back in clusters. For example, SSB0 and SSB1 are transmitted in a first slot "n", and SSB2 and SSB3 are transmitted in a second slot "n+1" immediately thereafter. The transmissions can be repeated periodically in other slots, such as SSB0 and SSB1 are transmitted periodically each time in a same slot, and, likewise, SSB2 and SSB3 are transmitted periodically each in a next immediate slot.

Figure 3:
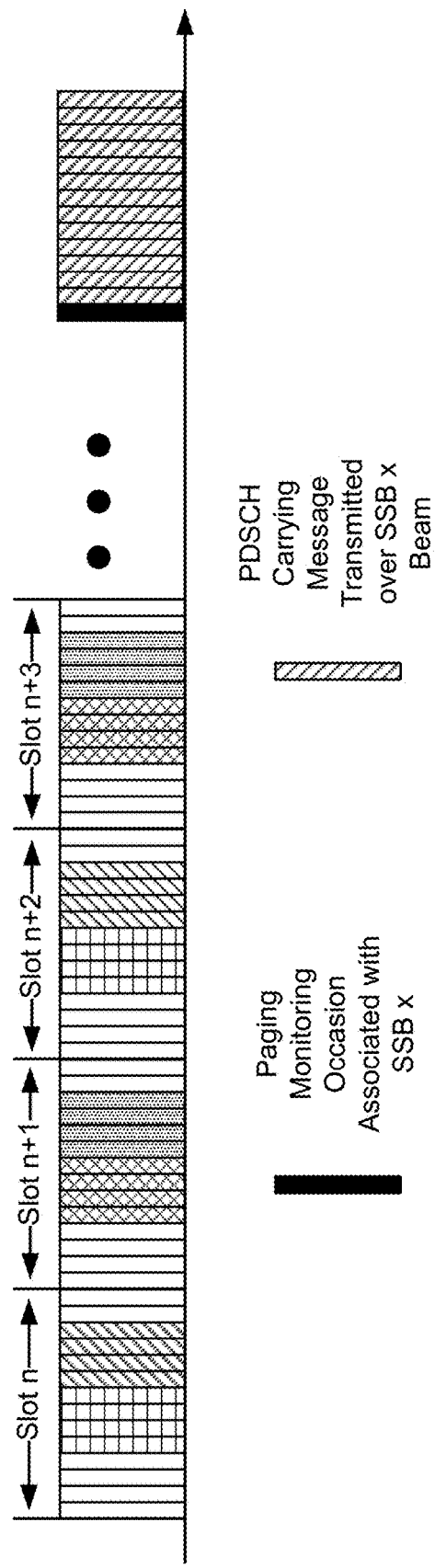
FIG. 3 illustrates an example of paging occasion monitoring and related PDSCH decoding based on SSB measurements, in accordance with some embodiments.

FIG. 3 illustrates an example 300 of paging occasion monitoring and related PDSCH decoding based on SSB measurements, in accordance with some embodiments. Generally, a UE performs an SSB search and measurement to detect an SSB sent on an SSB beam, and performs an SSB measurement to determine a coverage quality (e.g., SINR, RSRP, and/or RSRQ). The SSB search and measurement can be performed per SSB beam for multiple purposes.

For example, while in an idle mode and as the UE roams within a cell, the UE searches for all the deployed SSB's so that the strongest SSB beam can be identified and this SSB beam is used to stay in connection with the network. Further, the SSB beam search and measurement can be performed to detect deterioration of a serving cell. In particular, when the serving cell's SSB beams become weak, a neighbor cell search is triggered so that the UE can perform a cell re-selection before losing connection to the network.

In addition, the SSB search and measurement can be performed to enable the reception of information from the network when the UE is in the idle mode. An example of this information is paging messages, as illustrated in FIG. 3. In particular, during a DRX cycle, the UE can wake up to monitor paging occasions and receive paging messages; whereby the UE selects the strongest SSB beam (illustrated in FIG. 3 as "SSB x beam") for the search of a paging occasion transmitted over that SSB beam and, if one is found, then the decoding of a paging message is also transmitted over that SSB beam.

For example, the UE may be operating in an idle mode where no data is being communicated with the network. The UE can deactivate (e.g., turn off or enter a power save mode) some or all of its RF components (e.g., transmission components and/or reception components) during a DRX cycle to reduce its power consumption. Nonetheless, the UE can wake up to receive SSBs transmitted from the network (e.g. by a gNB). As such, the DRX cycle can be divided into multiple sub-cycles: a deep sleep cycle, an active state cycle, and a light sleep cycle. The deep sleep cycle is associated with the least power consumption, whereas the active state cycle is associated with the highest power consumption of the UE during the DRX cycle. During the deep sleep cycle, the RF components are deactivated and the UE does not receive or transmit to the network. During the active state cycle, the UE is woken up (e.g., its RF components are activated) to enable reception and/or transmission. The light sleep cycle can follow the active state cycle, whereby some but not all of the RF components are deactivated (e.g., in this way, if the UE needs to re-enter the active state cycle, the switch from the light sleep cycle to the active state cycle is relatively faster than the equivalent switch from the deep sleep cycle; for instance, RF tuning can be faster given the smaller subset of RF components that are deactivated in the light sleep cycle).

In an example, during the active state cycle, the UE is in an active state that enables it to receive SSBs during a time window. The time window during which the UE wakes up (e.g., equivalently, needs to be in the active state) can be pre-configured. For instance, this time window can be an SSB measurement timing configuration (SMTC) window.

The UE can receive and perform SSB measurement on the SSBs to select an SSB beam (e.g., the SSB x beam with the best SSB measurement). Having selected this beam, the UE can monitor a paging occasion transmitted from the network (e.g., by the gNB) to the UE over the selected SSB beam. Generally, the paging occasion can be a PDCCH monitoring occasion, whereby the UE can perform blind decoding in a search space of the PDCCH on the selected SSB beam to determine the paging occasion. This paging occasion can include DCI that schedules a paging message on a PDSCH of the selected SSB beam. Also generally, resources of the PDSCH (e.g., the scheduled resource elements) can carry (e.g., encode) the information of the paging message. If the paging message is scheduled (e.g., as indicated by the DCI), then the UE can decode the paging message from the resources of the PDSCH.

Figure 4:
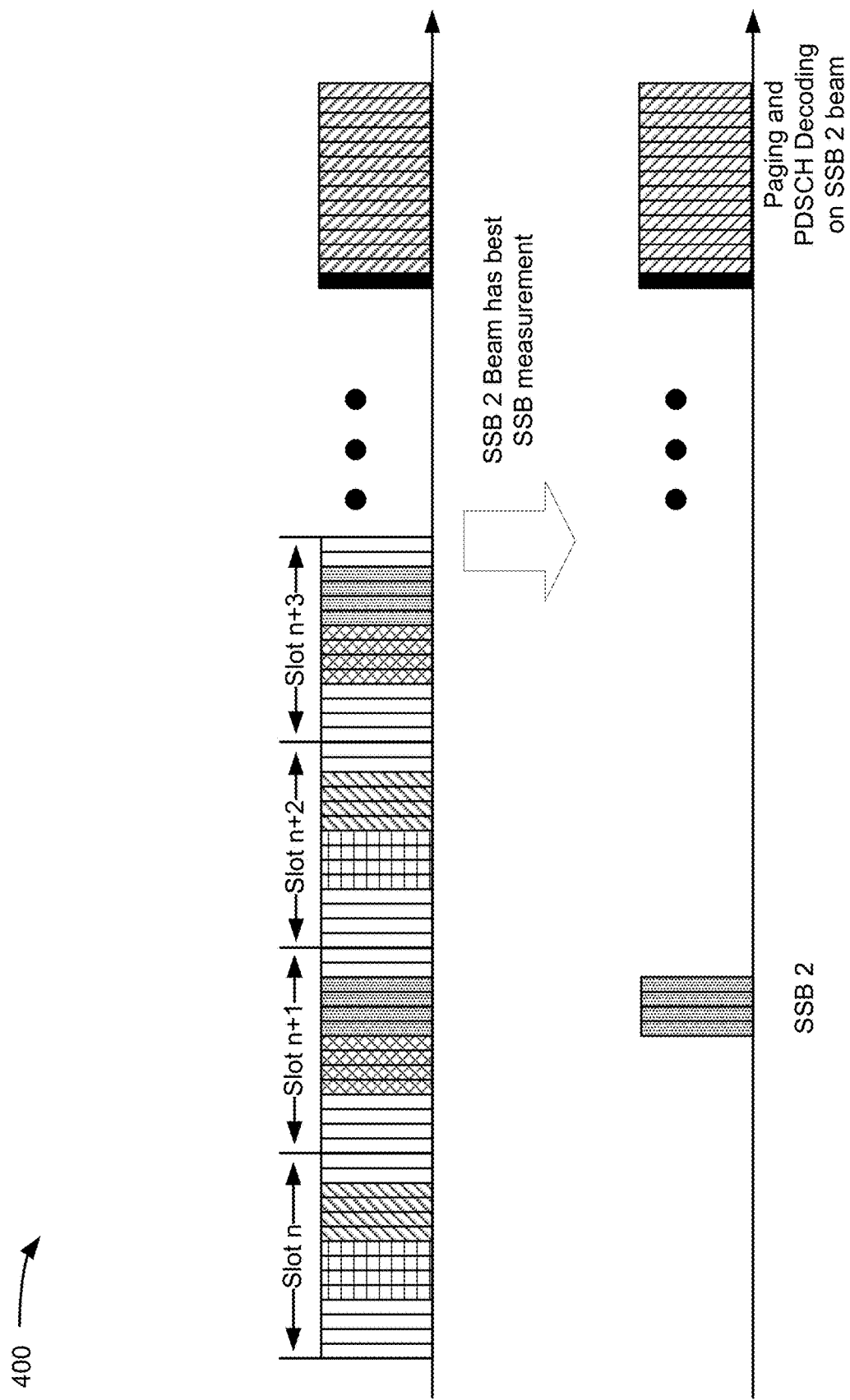
FIG. 4 illustrates an example of an SSB beam selection for paging occasion monitoring and related PDSCH decoding, in accordance with some embodiments.

FIG. 4 illustrates an example 400 of an SSB beam selection for paging occasion monitoring and related PDSCH decoding, in accordance with some embodiments. Generally, when a currently selected SSB beam is strong enough, searching and/or measuring other SSB beams can incur unnecessary power consumption due to extended UE ON time (e.g., being in an active state of a DRX cycle). Measuring only a single selected SSB beam significantly reduces the time UE needs to stay ON, and therefore can achieve power savings.

For example, and as illustrated in FIG. 4, by slot "n+1," the UE may have received and measured SSB 0, SSB 1, SSB 2, and SSB 3, and determined that the measurement on SSB 2 is the best among the SSB measurements, and, thus, it can select SSB beam having index "2." Conventionally, the UE may continue the SSB search and measurement during the SMTC window, whereby the SSBs in slots "n+2" and "n+3" may be searched and measured too, which corresponds to the UE being in the active state during, at least, portions of these two additional slots. However, embodiments of the present disclosure can avoid this additional SSB search and measurement for at least the remainder of the SMTC window and/or during a next SMTC window. For example, during the remainder of the SMTC window, the UE can be in a sleep state (deep sleep or light sleep during slots "n+2" and "n+3"). That is possible because, per the measurements over slots "n" and "n+1," the UE may select SSB beam "2" for having the best SSB measurement. The UE can then use this selected beam for paging monitoring and PDSCH decoding. Alternatively, during the SMTC window, the UE may wake up only during a portion slot "n+3" to measure again SSB 2 on the selected SSB beam "2." Additionally or alternatively, during the next SMTC window, the UE may wake up only at the associated time(s) to measure SSB(s) 2 received on the selected SSB beam "2."

Figure 5:
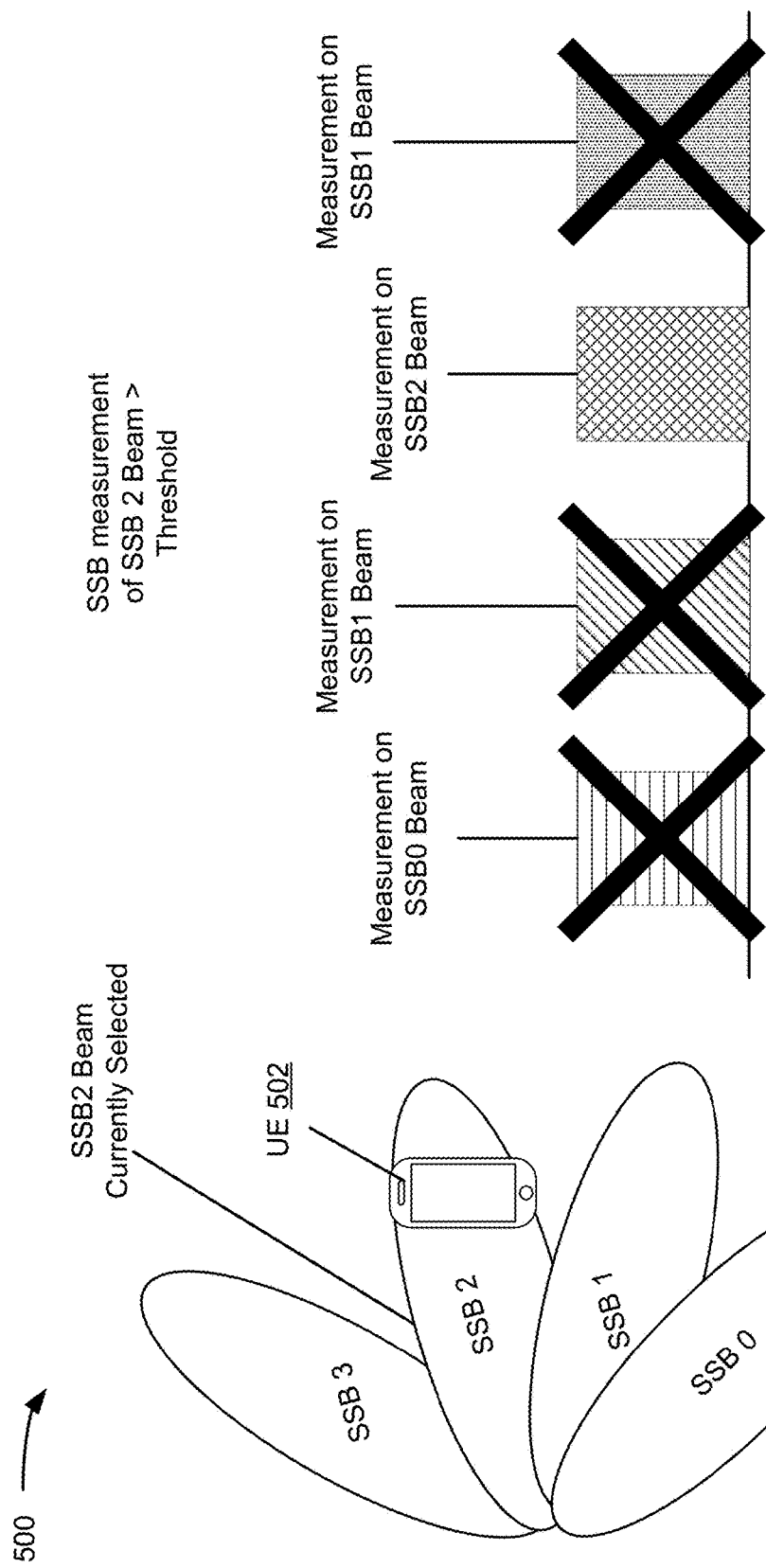
FIG. 5 illustrates an example of scheduling SSB measurements, in accordance with some embodiments.

FIG. 5 illustrates an example 500 of scheduling SSB measurements, in accordance with some embodiments. As illustrated, a UE 502 may be in a direct coverage area of SSB beam "2" (this beam is described herein for illustrative purposes only, and the embodiments similarly apply to any other beam and/or type of coverage). For that reason, the SSB measurement associated with SSB beam "2" may be the best beam among the SSB measurements.

The UE 502 can select SSB beam "2" and can compare the corresponding SSB measurement to a measurement threshold. Assuming that the comparison indicates that SSB beam "2" has a sufficient or acceptable SSB measurement (e.g., the SSB measurement exceeds the measurement threshold), the UE 502 can select SSB beam "2" for paging monitoring and PDSCH decoding. As such, during at least a remainder of an SMTC window and/or during a subsequent SMTC window, the UE 502 need not schedule search and measurement on the remaining SSBs (as indicated with the "X" mark). The UE 502 may optionally, but not necessarily, schedule and measure any additional SSB received on the selected SSB beam "2" during the remainder of the SMTC window. For a next SMTC window, the UE 502 can schedule and measure one or more SSBs received over the selected SSB beam "2" during this window for a next comparison to the measurement threshold.

Figure 6:
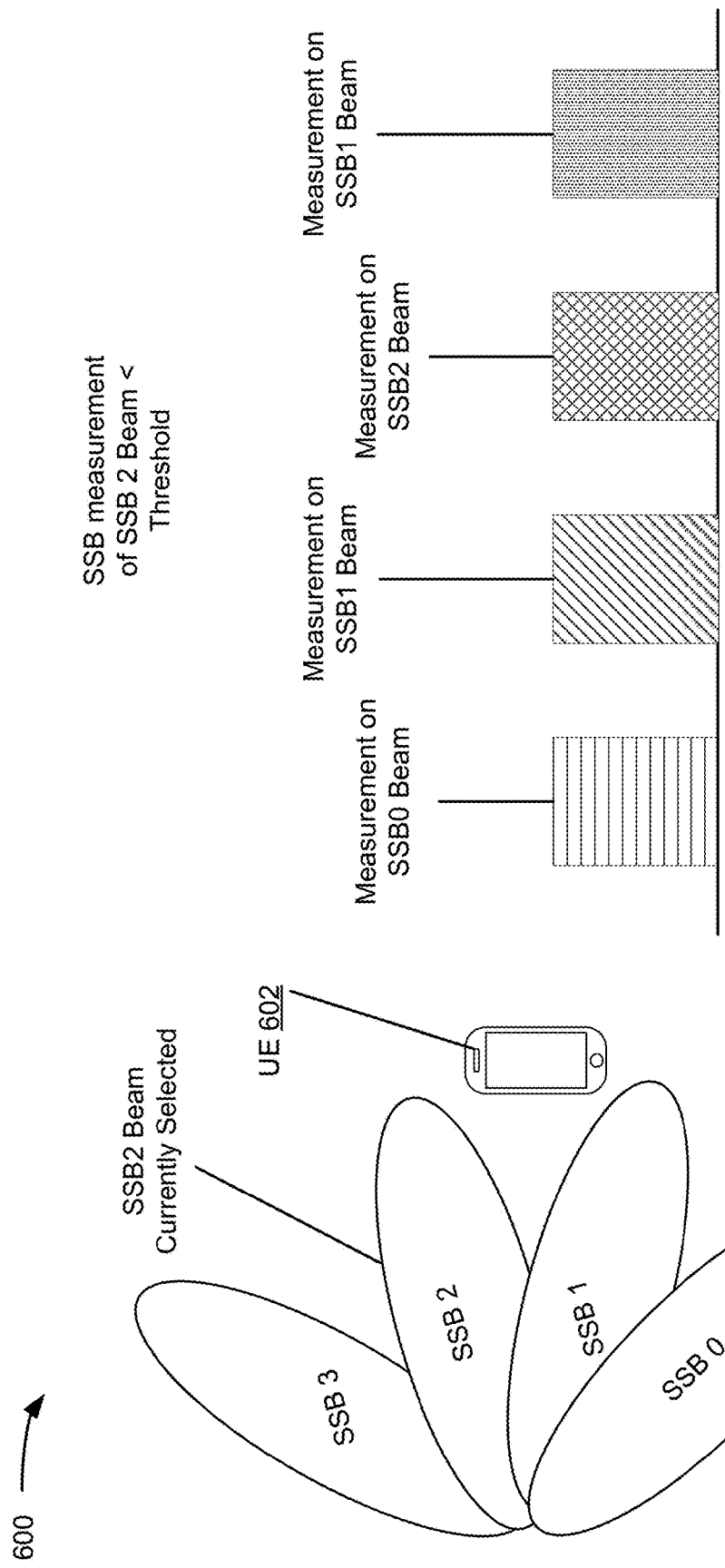
FIG. 6 illustrates another example of scheduling SSB measurements, in accordance with some embodiments.

FIG. 6 illustrates another example 600 of scheduling SSB measurements, in accordance with some embodiments. As illustrated, a UE 602 may be in an indirect coverage area between SSB beams (e.g., SSB beam "1" and SSB beam "2" are beam is described herein for illustrative purposes only, and the embodiments similarly apply to any other beam and/or type of coverage). Further, the UE 602 may be located at the edge of the cell that the SSB beams form. This indirect coverage and/or edge location can result in the SSB measurements being weak (e.g., the best SSB measurement among the SSB beams may be smaller than a measurement threshold).

Like in FIG. 5, the UE 602 can select SSB beam "2" for having the best SSB measurement. However here, the UE 602 can compare this SSB measurement to the measurement threshold, where the comparison indicates that SSB beam "2" does not have a sufficient or acceptable SSB measurement (e.g., the SSB measurement is smaller the measurement threshold). Accordingly, during at least a remainder of an SMTC window and/or during a subsequent SMTC window, the 602 can schedule an SSB search and measurement per SSB beam, such that all SSB beams are measured.

In FIGS. 5 and 6, the illustrated SSB beams form a serving cell. Although not illustrated in FIGS. 5 and 6, a neighbor cell (or multiples of such cells) may also exist. As the serving cell SSB beam's become weaker, a cell search can be triggered, whereby the UE may select the neighbor cell to become the serving cell. In certain situations, the neighbor cell may be an intra-frequency neighbor cell, that is a cell that transmits over the same carrier frequency as the serving cell (e.g., the beams of the neighbor cell and the beams of the serving cell use the same component carrier or a same frequency band). If an intra-frequency neighbor cell is to be measured (e.g., in support of a cell reselection), the UE can perform an SSB search and measurement per beam of the serving cell, and per beam of the intra-frequency neighbor cell.

Figure 7:
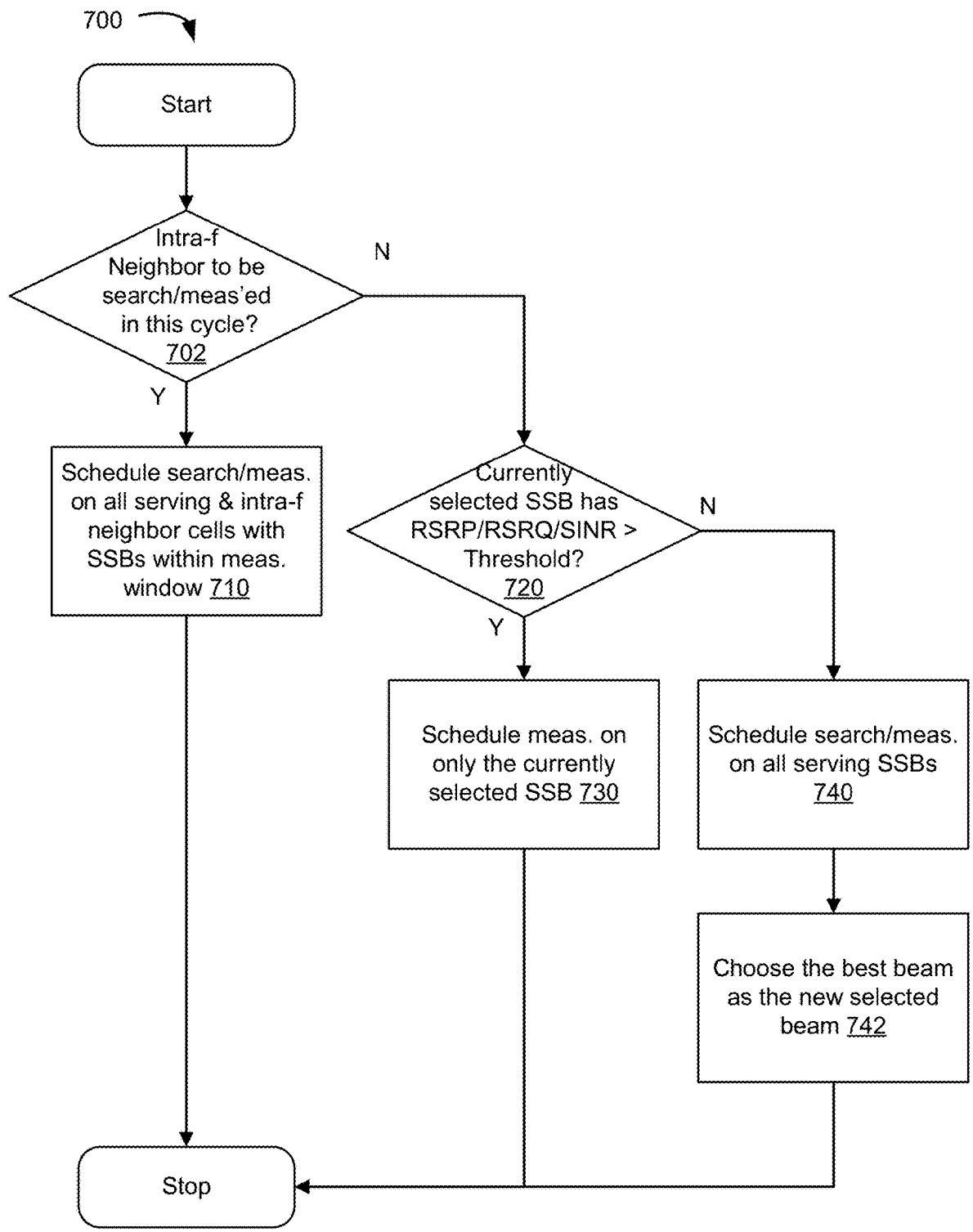
FIG. 7 illustrates an example of an operational flow/algorithmic structure for scheduling SSB measurements, in accordance with some embodiments.

FIG. 7 illustrates an example of an operational flow/algorithmic structure 700 for scheduling SSB measurements, in accordance with some embodiments. A UE (for example, the UE 104 or UE 1200), or components of the UE, such as processor 1204, can implement operational flow/algorithmic structure 700, whereby it may be sufficient for the UE to schedule measurements on only a selected beam based on at least SSB measurement thresholding.

The operation flow/algorithmic structure 700 may include, at 702, determining whether an intra-frequency neighbor cell is to be measured during a DRX cycle. In some embodiments, this determination can be based on a trigger. Different triggers are possible, such the UE performing a cell search, or a cell re-selection procedure and/or a reception of a DCI requesting the measurement. If at least one intra-frequency neighbor cell is to be measured, operation 710 can follow operation 702. Otherwise, operation 720 can be performed next.

The operation flow/algorithmic structure 700 may also include, at 710, scheduling search and measurement on all serving and intra-frequency neighbor cells with SSBs within a measurement window. In some embodiments, the measurement window is an SMTC window, whereby SSBs can be transmitted on different beams within each cell according to one or more SSB periodicities. The UE can be preconfigured via, for example, RRC signaling with parameters for searching and measuring SSBs transmitted on the beams. The UE can, accordingly, schedule an SSB search and measurement per beam.

The operation flow/algorithmic structure 700 may also include, at 720, determining whether a currently selected SSB has an RSRP, RSRQ, and/or SINR that exceeds one or more measurement thresholds. In some embodiments, the SSB is received on a particular SSB beam. This SSB beam may have been previously selected for having the best SSB measurement(s) among the SSB beams of the serving cell (e.g., the SSB measurement(s) may correspond to a previous SMTC window). If this SSB measurement(s) exceeds the measurement threshold(s), then operation 730 can follow operation 720. Otherwise, operation 740 can be performed next. In other embodiments, during a current SMTC window, SSBs are periodically received. At the end of each time period, the derived SSB measurements are compared to select the SSB having the best SSB measurement(s). This SSB measurement(s) is compared to the measurement threshold(s). Here also, depending on the comparison, either operation 730 or 740 can follow operation 720.

The operation flow/algorithmic structure 700 may also include, at 730, scheduling measurement on only the currently selected SSB. In this embodiment that involves the previous SMTC window and the particular SSB beam that was selected, the UE schedules one or more SSB measurements during the current SMTC window, where the measurement(s) are on SSB(s) received on the particular SSB beam. In an embodiment that involves the current SMTC window and the selection of an SSB of a particular SSB beam at the end of a time period within the current SMTC window, the UE schedules one or more SSB measurements during the remainder portion of current SMTC window, where the measurement(s) are on SSB(s) received on the particular SSB beam.

The operation flow/algorithmic structure 700 may also include, at 740, scheduling search and measurement on all serving SSBs. In some embodiments, during the current SMTC window, SSBs are received on all the SSB beams of the serving cell. Here, the UE performs an SSB search and measurement per SSB beam.

The operation flow/algorithmic structure 700 may also include, at 742, choosing the best beam as the new selected beam. In some embodiments, RSRP, RSRQ, and/or SINR are determined per SSB beam, and these SSB measurements are compared across the SSB beams to select the SSB beam with the best SSB measurement(s). This selected SSB beam can be used when the operational flow/algorithmic structure 700 is repeated.

Although the operation flow/algorithmic structure 700 is illustrated as stopping after each of operations 710, 730 and 742, the UE can continue performing other operations related to the SSB search and measurement, such as performing the actual measurements, selecting a cell, and the like. The operation flow/algorithmic structure 700 can also be repeated during a next SMTC window and/or a next DRX cycle.

Figure 8:
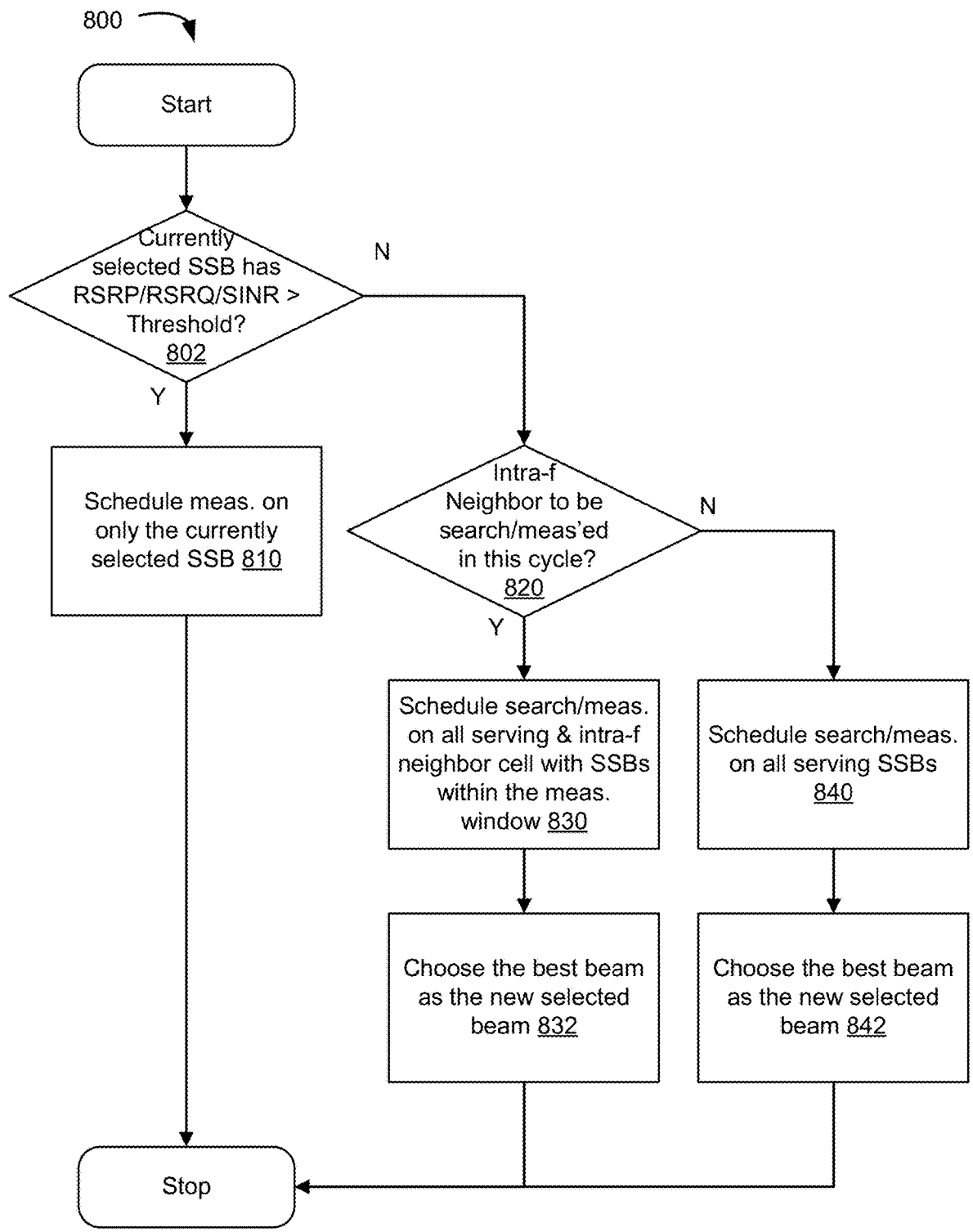
FIG. 8 illustrates another example of an operational flow/algorithmic structure for scheduling SSB measurements, in accordance with some embodiments.

FIG. 8 illustrates another example of an operational flow/algorithmic structure 800 for scheduling SSB measurements, in accordance with some embodiments. The operational flow/algorithmic structure 800 can be implemented by a UE, and represents a variation to the operational flow/algorithmic structure 700, whereby the SSB measurement of the selected SSB beam is thresholded prior to determining whether an intra-frequency neighbor cell is to be measured. Some of the operations of the operational flow/algorithmic structure 800 are similar to those of the operational flow/algorithmic structure 700. Similarities are not repeated herein in the interest of brevity, but equivalently apply herein.

The operation flow/algorithmic structure 800 may include, at 802, determining whether a currently selected SSB has an RSRP, RSRQ, and/or SINR that exceeds one or more measurement thresholds. In some embodiments, operation 802 is similar to operation 720.

The operation flow/algorithmic structure 800 may also include, at 810, scheduling measurement on only the currently selected SSB. In some embodiments, operation 810 is similar to operation 730.

The operation flow/algorithmic structure 800 may also include, at 820, determining whether an intra-frequency neighbor cell is to be measured during a DRX cycle. In some embodiments, operation 820 is similar to operation 702.

The operation flow/algorithmic structure 800 may also include, at 830, scheduling search and measurement on all serving and intra-frequency neighbor cells with SSBs within a measurement window. In some embodiments, operation 830 is similar to operation 710.

The operation flow/algorithmic structure 800 may also include, at 832, choosing the best beam as the new selected beam. In some embodiments, RSRP, RSRQ, and/or SINR are determined per SSB beam across the serving cell and the intra-frequency neighbor cell(s), and these SSB measurements are compared to select the SSB beam with the best SSB measurement(s). This selected SSB beam can be used when the operational flow/algorithmic structure 800 is repeated.

The operation flow/algorithmic structure 800 may also include, at 840, scheduling search and measurement on all serving SSBs. In some embodiments, operation 840 is similar to operation 740.

The operation flow/algorithmic structure 800 may also include, at 842 choosing the best beam as the new selected beam. In some embodiments, operation 842 is similar to operation 742.

Here, although the operation flow/algorithmic structure 800 is illustrated as stopping after each of operations 810, 832 and 842, the UE can continue performing other operations related to the SSB search and measurement, such as performing the actual measurements, selecting a cell, and the like. The operation flow/algorithmic structure 800 can also be repeated during a next SMTC window and/or a next DRX cycle.

Figure 9:
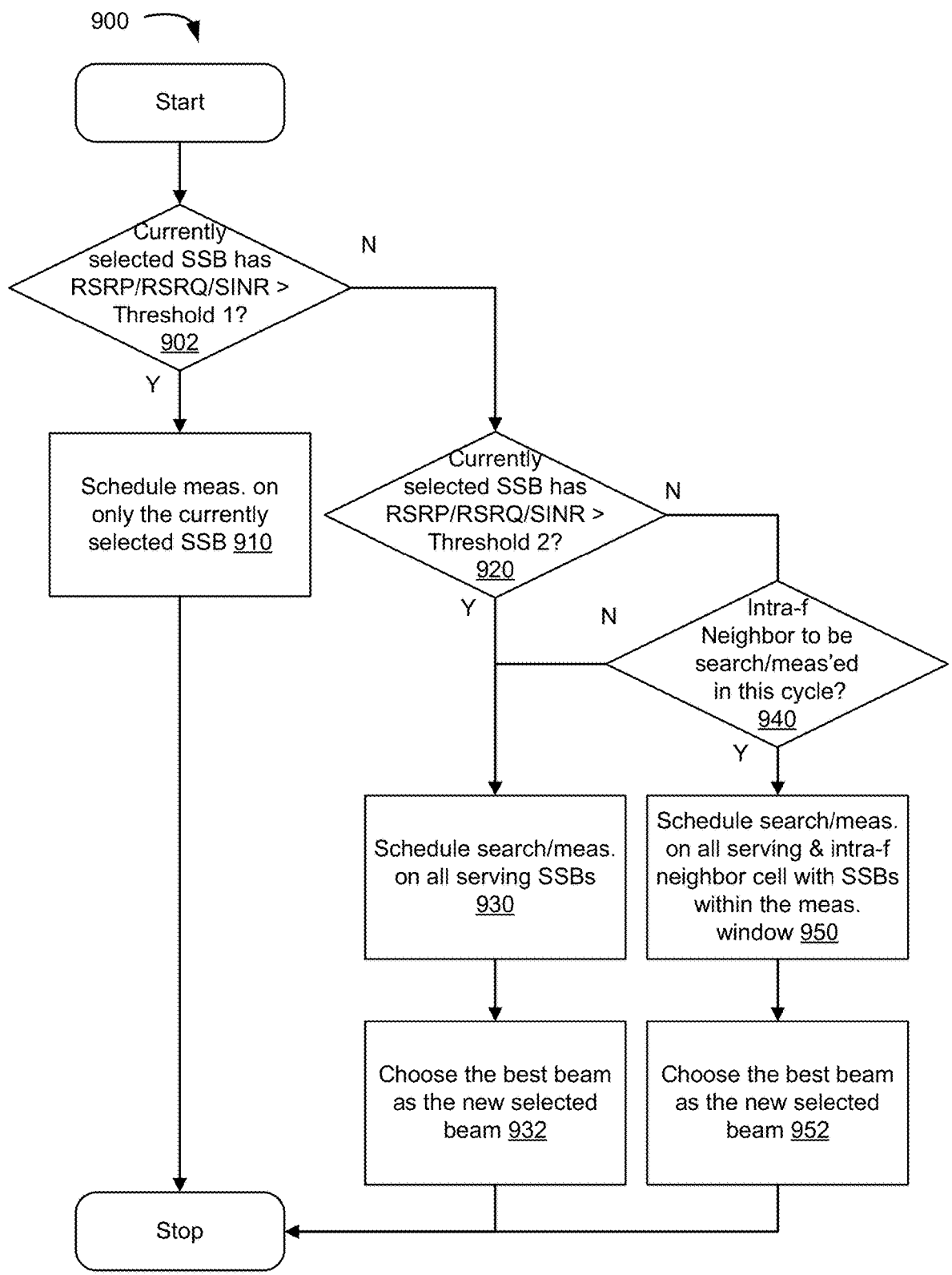
FIG. 9 illustrates yet another example of an operational flow/algorithmic structure for scheduling SSB measurements, in accordance with some embodiments.

FIG. 9 illustrates yet another example of an operational flow/algorithmic structure 900 for scheduling SSB measurements, in accordance with some embodiments. The operational flow/algorithmic structure 900 can be implemented by a UE, and represents a variation to the operational flow/algorithmic structure 800, whereby the SSB measurement of the selected SSB beam is compared to multiple measurement thresholds prior to determining whether an intra-frequency neighbor cell is to be measured. Some of the operations of the operational flow/algorithmic structure 900 are similar to those of the operational flow/algorithmic structure 800. Similarities are not repeated herein in the interest of brevity, but equivalently apply herein.

The operation flow/algorithmic structure 900 may include, at 902, determining whether a currently selected SSB has an RSRP, RSRQ, and/or SINR that exceeds one or more first measurement thresholds. In some embodiments, operation 902 is similar to operation 802.

The operation flow/algorithmic structure 900 may also include, at 910, scheduling measurement on only the currently selected SSB. In some embodiments, operation 910 is similar to operation 830.

The operation flow/algorithmic structure 900 may also include, at 920, determining whether a currently selected SSB has an RSRP, RSRQ, and/or SINR that exceeds one or more second measurement thresholds. In some embodiments, operation 920 is similar to operation 902, except that the each one of the one or more second measurement thresholds is typically smaller than a corresponding one of the one or more first measurement thresholds. In such embodiments, even though the SSB measurement(s) of the best SSB beam may not be strong enough (e.g., per the outcome of operation 902) to justify the scheduling of an SSB measurement on that SSB beam only, the SSB measurement(s) may still be strong enough (e.g., per the outcome of operation 920) to avoid the need for scheduling an SSB search and measurement on an intra-frequency neighbor cell. If the RSRP, RSRQ, and/or SINR exceeds the one or more second measurement thresholds, operation 930 can follow operation 920, whereby no SSB search and measurement needs to be scheduled on an intra-frequency neighbor cell. Otherwise, operation 940 can be performed to determine whether an SSB search and measurement is needed on an intra-frequency neighbor cell.

The operation flow/algorithmic structure 900 may also include, at 930, scheduling search and measurement on all serving SSBs. In some embodiments, operation 930 is similar to operation 840.

The operation flow/algorithmic structure 900 may also include, at 932 choosing the best beam as the new selected beam. In some embodiments, operation 932 is similar to operation 842.

The operation flow/algorithmic structure 900 may also include, at 940, determining whether an intra-frequency neighbor cell is to be measured during a DRX cycle. In some embodiments, operation 940 is similar to operation 820. If so, then operation 950 can follow operation 940. Otherwise, operation 930 can be performed.

The operation flow/algorithmic structure 900 may also include, at 950, scheduling search and measurement on all serving and intra-frequency neighbor cells with SSBs within a measurement window. In some embodiments, operation 950 is similar to operation 830.

The operation flow/algorithmic structure 900 may also include, at 952, choosing the best beam as the new selected beam. In some embodiments, operation 952 is similar to operation 832.

Here, although the operation flow/algorithmic structure 900 is illustrated as stopping after each of operations 910, 932 and 952, the UE can continue performing other operations related to the SSB search and measurement, such as performing the actual measurements, selecting a cell, and the like. The operation flow/algorithmic structure 900 can also be repeated during a next SMTC window and/or a next DRX cycle.

FIG. 10 illustrates an overall example of an operational flow/algorithmic structure 1000 for scheduling SSB measurements, in accordance with some embodiments. The operational flow/algorithmic structure 1000 can be implemented by a UE, and represents an overall operational flow/algorithmic structure that captures the variations of FIGS. 7-9. In other words, the UE implementing the operational flow/algorithmic structure 1000 can implement any, or a combination of, operation(s) of the operational flow/algorithmic structures 700-900.

The operation flow/algorithmic structure 1000 may include, at 1002, receiving, during a discontinuous reception (DRX) cycle, a first plurality of SSBs that respectively correspond to a plurality of beams of a base station. In some embodiments, the SSBs are received during an SMTC window, and the beams are SSB beams of a serving cell. In certain situations, SSBs can also be received on SSB beams of an intra-frequency neighbor cell.

The operation flow/algorithmic structure 1000 may also include, at 1004, selecting a first beam of the plurality of beams based on a first measurement that corresponds to a first SSB of the first plurality of SSBs, the first SSB received on the first beam. In some embodiments, the SSBs are measured to determine SSB measurements, such as RSRP, RSRQ, and/or SINR per SSB beam. The first beam may be an SSB beam having the best SSB measurement (e.g., the largest RSRP, the largest RSRQ, and/or the largest SINR).

The operation flow/algorithmic structure 1000 may also include, at 1006, comparing the first measurement to a measurement threshold. In some embodiments, the measurement threshold is predefined, and can be a first measurement threshold to determine if it is sufficient to perform an SSB measurement on the selected first beam. A second measurement threshold can be defined and used in a second comparison to determine whether it is sufficient to perform an SSB search and measurement on the SSB beams of the serving cell only, per FIG. 9.

The operation flow/algorithmic structure 1000 may also include, at 1008, scheduling, based on said comparing, either (i) a second measurement that corresponds to a second SSB to be received on the first beam, or (ii) an SSB search and measurement per beam of the plurality of beams. In some embodiments, if the SSB measurement exceeds the first threshold, then only the second measurement is scheduled. Otherwise, the SSB search and measurement per beam is scheduled. Here, the second comparison to the second measurement can be also used to determine whether an SSB search and measurement per SSB beam of an intra-frequency neighbor cell is needed.

Figure 11:
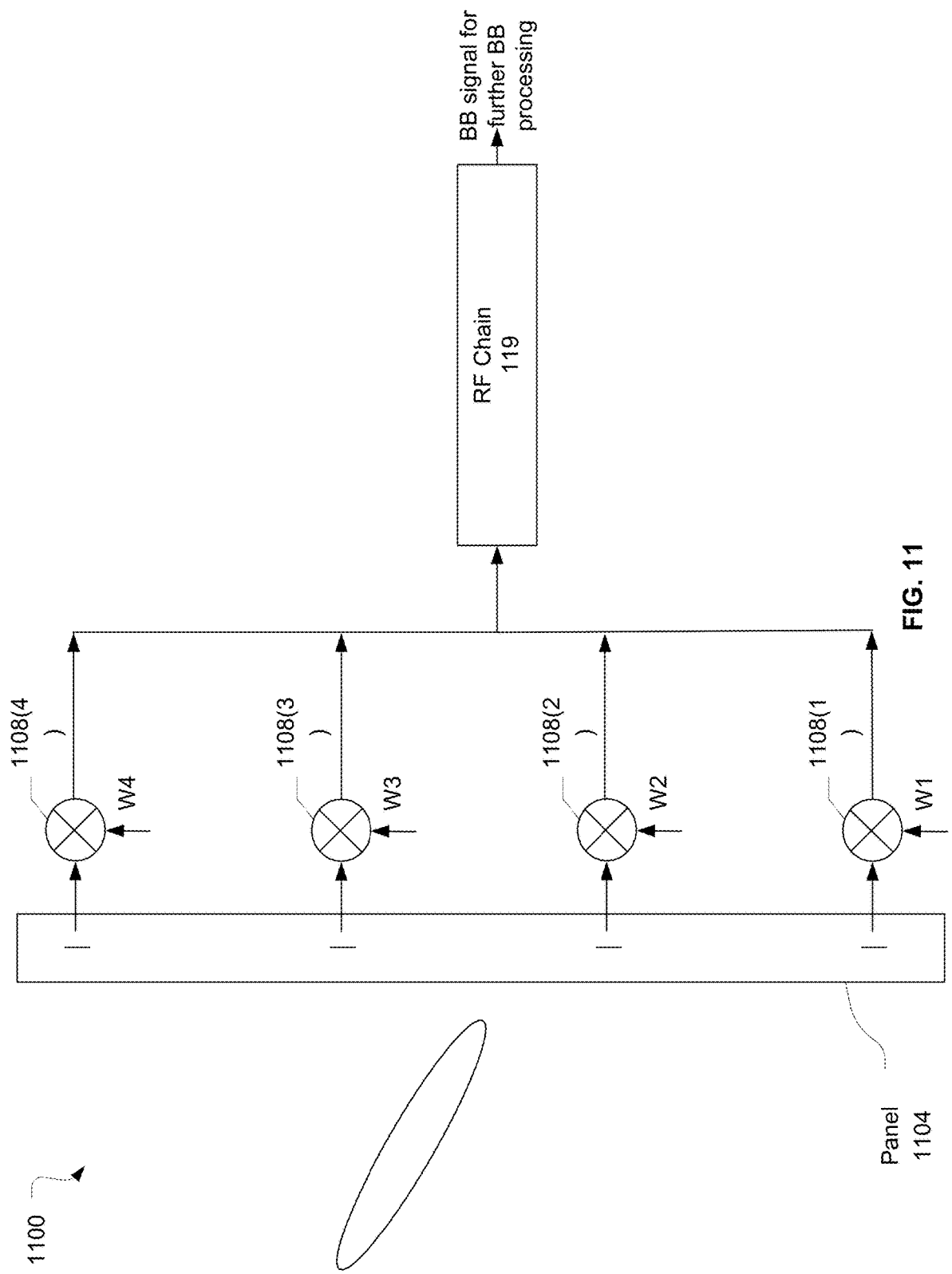
FIG. 11 illustrates an example of receive components, in accordance with some embodiments.

FIG. 11 illustrates receive components 1100 of the UE 104, in accordance with some embodiments. The receive components 1100 may include an antenna panel 1104 that includes a number of antenna elements. The panel 1104 is shown with four antenna elements, but other embodiments may include other numbers.

The antenna panel 1104 may be coupled to analog beamforming (BF) components that include a number of phase shifters 1108(1)-1008(4). The phase shifters 1108(1)-1008(4) may be coupled with a radio-frequency (RF) chain 1112. The RF chain 1112 may amplify a receive analog RF signal, down convert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values to the phase shifters 1108(1)-1008(4) to provide a receive beam at the antenna panel 1104. These BF weights may be determined based on the channel-based beamforming.

Figure 12:
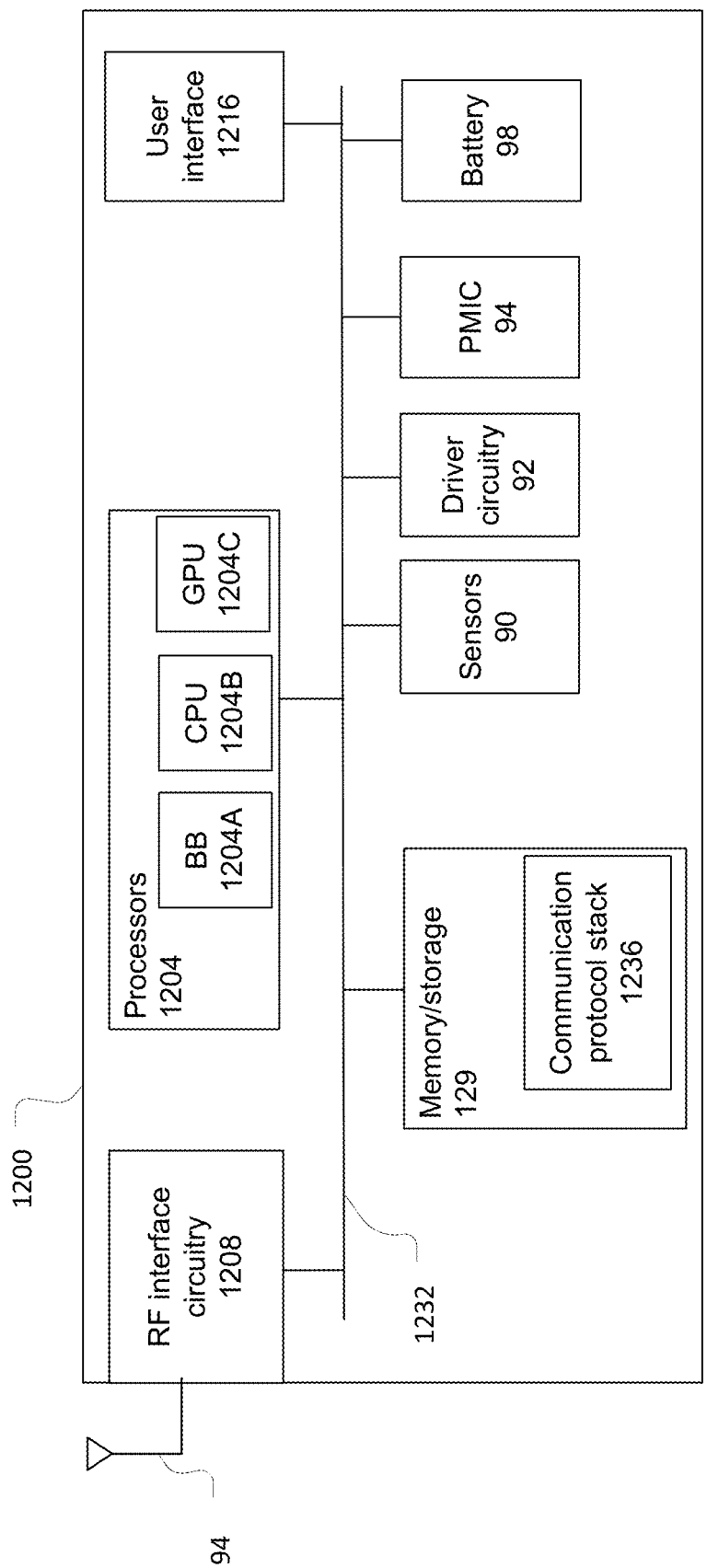
FIG. 12 illustrates an example of a UE, in accordance with some embodiments.

FIG. 12 illustrates a UE 1200, in accordance with some embodiments. The UE 1200 may be similar to, and substantially interchangeable with, UE 104 of FIG. 1.

Similar to that described above with respect to UE 104, the UE 1200 may be any mobile or non-mobile computing device, such as mobile phones, computers, tablets, industrial wireless sensors (e.g., microphones, carbon dioxide sensors, pressure sensors, humidity sensors, thermometers, motion sensors, accelerometers, laser scanners, fluid level sensors, inventory sensors, electric voltage/current meters, and actuators), video surveillance/monitoring devices (e.g., cameras and video cameras), wearable devices, or relaxed-IoT devices. In some embodiments, the UE may be a reduced capacity UE or NR-Light UE.

The UE 1200 may include processors 1204, RF interface circuitry 1208, memory/storage 1212, user interface 1216, sensors 1220, driver circuitry 1222, power management integrated circuit (PMIC) 1224, and battery 1228. The components of the UE 1200 may be implemented as integrated circuits (ICs), portions thereof, discrete electronic devices, or other modules, such as logic, hardware, software, firmware, or a combination thereof. The block diagram of FIG. 12 is intended to show a high-level view of some of the components of the UE 1200. However, some of the components shown may be omitted, additional components may be present, and different arrangements of the components shown may occur in other implementations.

The components of the UE 1200 may be coupled with various other components over one or more interconnects 1232 which may represent any type of interface, input/output, bus (local, system, or expansion), transmission line, trace, optical connection, etc. that allows various circuit components (on common or different chips or chipsets) to interact with one another.

The processors 1204 may include processor circuitry, such as baseband processor circuitry (BB) 1204A, central processor unit circuitry (CPU) 1204B, and graphics processor unit circuitry (GPU) 1204C. The processors 1204 may include any type of circuitry or processor circuitry that executes, or otherwise operates, computer-executable instructions, such as program code, software modules, or functional processes from memory/storage 1212 to cause the UE 1200 to perform operations as described herein.

In some embodiments, the baseband processor circuitry 1204A may access a communication protocol stack 1236 in the memory/storage 1212 to communicate over a 3GPP compatible network. In general, the baseband processor circuitry 1204A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1208.

The baseband processor circuitry 1204A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 1204A may also access group information 1224 from memory/storage 1212 to determine search space groups in which a number of repetitions of a PDCCH may be transmitted.

The memory/storage 1212 may include any type of volatile or non-volatile memory that may be distributed throughout the UE 1200. In some embodiments, some of the memory/storage 1212 may be located on the processors 1204 themselves (for example, L1 and L2 cache), while other memory/storage 1212 is external to the processors 1204, but accessible thereto via a memory interface. The memory/storage 1212 may include any suitable volatile or non-volatile memory, such as, but not limited to, dynamic random-access memory (DRAM), static random-access memory (SRAM), erasable programmable read-only memory (EPROM), electrically erasable programmable read-only memory (EEPROM), Flash memory, solid-state memory, or any other type of memory device technology.

The RF interface circuitry 1208 may include transceiver circuitry and a radio frequency front module (RFEM) that allows the UE 1200 to communicate with other devices over a radio access network. The RF interface circuitry 1208 may include various elements arranged in transmit or receive paths. These elements may include switches, mixers, amplifiers, filters, synthesizer circuitry, control circuitry, etc.

In the receive path, the RFEM may receive a radiated signal from an air interface via an antenna 1224 and proceed to filter and amplify (with a low-noise amplifier) the signal. The signal may be provided to a receiver of the transceiver that down-converts the RF signal into a baseband signal that is provided to the baseband processor of the processors 1204.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1224.

In various embodiments, the RF interface circuitry 1208 may be configured to transmit/receive signals in a manner compatible with NR access technologies.

The antenna 1224 may include a number of antenna elements that each convert electrical signals into radio waves to travel through the air, and to convert received radio waves into electrical signals. The antenna elements may be arranged into one or more antenna panels. The antenna 1224 may have antenna panels that are omnidirectional, directional, or a combination thereof to enable beamforming and multiple input, multiple output communications. The antenna 1224 may include micro-strip antennas, printed antennas that are fabricated on the surface of one or more printed circuit boards, patch antennas, phased array antennas, etc. The antenna 1224 may have one or more panels designed for specific frequency bands including bands in FR1 or FR2.

The user interface circuitry 1216 includes various input/output (I/O) devices designed to enable user interaction with the UE 1200. The user interface 1216 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (e.g., binary status indicators, such as light emitting diodes (LEDs)) and multi-character visual outputs, or more complex outputs, such as display devices or touchscreens (e.g., liquid crystal displays (LCDs), LED displays, quantum dot displays, projectors), with the output of characters, graphics, multimedia objects, and the like being generated or produced from the operation of the UE 1200.

The sensors 1220 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example, cameras or lens-less apertures); light detection and ranging sensors; proximity sensors (for example, infrared radiation detector and the like); depth sensors; ambient light sensors; ultrasonic transceivers; microphones or other like audio capture devices; etc.

The driver circuitry 1222 may include software and hardware elements that operate to control particular devices that are embedded in the UE 1200, attached to the UE 1200, or otherwise communicatively coupled with the UE 1200. The driver circuitry 1222 may include individual drivers allowing other components to interact with or control various input/output (I/O) devices that may be present within or connected to the UE 1200. For example, driver circuitry 1222 may include a display driver to control and allow access to a display device, a touchscreen driver to control and allow access to a touchscreen interface, sensor drivers to obtain sensor readings of sensor circuitry 1220 and control and allow access to sensor circuitry 1220, drivers to obtain actuator positions of electro-mechanic components or control and allow access to the electro-mechanic components, a camera driver to control and allow access to an embedded image capture device, or audio drivers to control and allow access to one or more audio devices.

The PMIC 1224 may manage power provided to various components of the UE 1200. In particular, with respect to the processors 1204, the PMIC 1224 may control power-source selection, voltage scaling, battery charging, or DC-to-DC conversion.

In some embodiments, the PMIC 1224 may control, or otherwise be part of, various power saving mechanisms of the UE 1200. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1200 may power down for brief intervals of time, and thus, save power. If there is no data traffic activity for an extended period of time, then the UE 1200 may transition off to an RRC Idle state, where it disconnects from the network and does not perform operations, such as channel quality feedback or handover. The UE 1200 goes into a very low power state, and it performs paging where, again, it periodically wakes up to listen to the network and then powers down again. The UE 1200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay, and it is assumed the delay is acceptable.

A battery 1228 may power the UE 1200, although in some examples the UE 1200 may be mounted or deployed in a fixed location, and may have a power supply coupled to an electrical grid. The battery 1228 may be a lithium-ion battery or a metal-air battery, such as a zinc-air battery, an aluminum-air battery, a lithium-air battery, and the like. In some implementations, such as in vehicle-based applications, the battery 1228 may be a typical lead-acid automotive battery.

Figure 13:
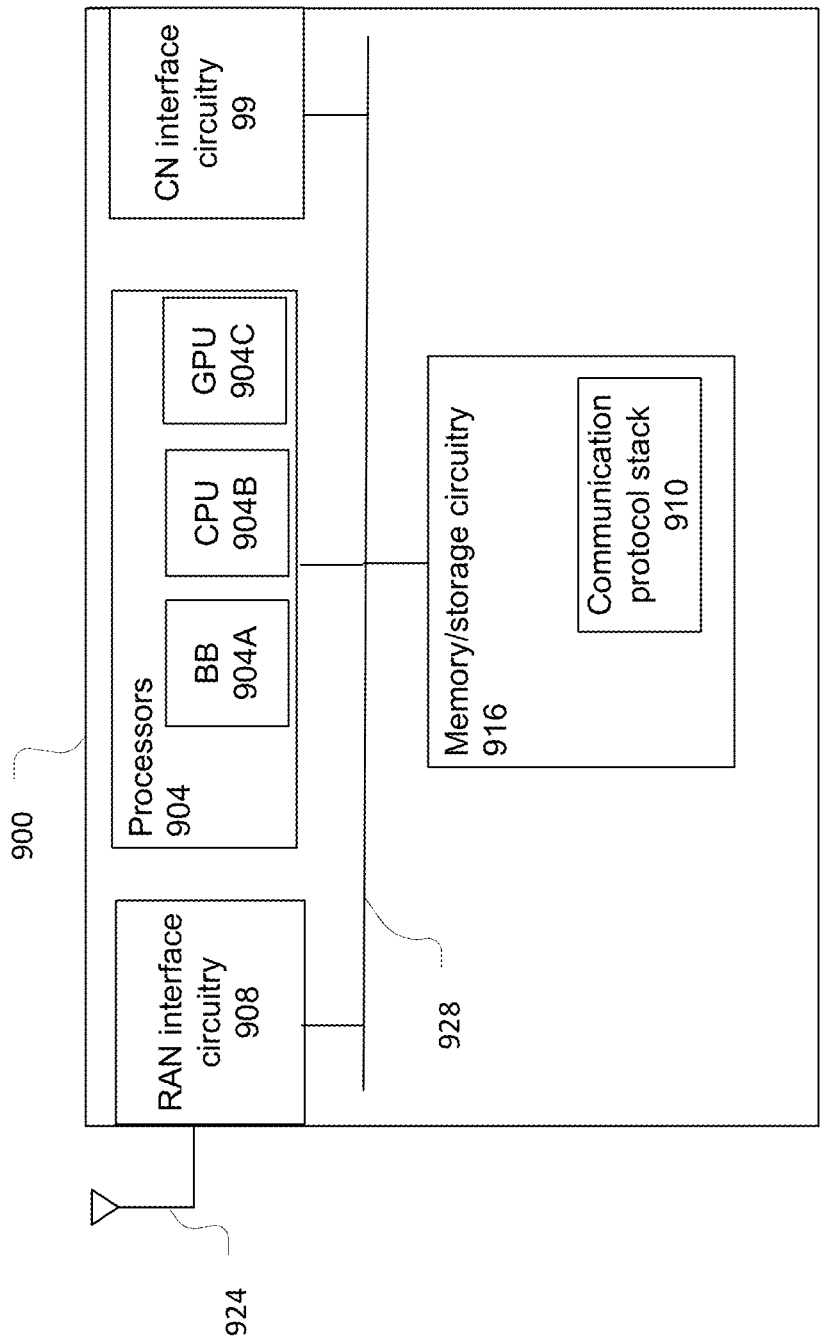
FIG. 13 illustrates an example of a base station, in accordance with some embodiments.

FIG. 13 illustrates a gNB 1300, in accordance with some embodiments. The gNB node 1300 may be similar to, and substantially interchangeable with, gNB 108.

The gNB 1300 may include processors 1304, RF interface circuitry 1308, core network (CN) interface circuitry 1312, and memory/storage circuitry 1316.

The components of the gNB 1300 may be coupled with various other components over one or more interconnects 1328.

The processors 1304, RF interface circuitry 1308, memory/storage circuitry 1316 (including communication protocol stack 1310), antenna 1324, and interconnects 1328 may be similar to like-named elements shown and described with respect to FIGS. 11 and 12.

The CN interface circuitry 1312 may provide connectivity to a core network, for example, a $5^{th}$ Generation Core network (5GC) using a 5GC-compatible network interface protocol, such as carrier Ethernet protocols, or some other suitable protocol. Network connectivity may be provided to/from the gNB 1300 via a fiber optic or wireless backhaul. The CN interface circuitry 1312 may include one or more dedicated processors or FPGAs to communicate using one or more of the aforementioned protocols. In some implementations, the CN interface circuitry 1312 may include multiple controllers to provide connectivity to other networks using the same or different protocols.

It is well understood that the use of personally-identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry, as described above in connection with one or more of the preceding figures, may be configured to operate, in accordance with one or more of the examples set forth below. In another example, circuitry associated with a UE, base station, network element, etc., as described above in connection with one or more of the preceding figures, may be configured to operate in accordance with one or more of the examples set forth below in the example section.

EXAMPLES

In the following sections, further exemplary embodiments are provided.

Example 1 includes a method implemented by a user equipment (UE), the method comprising: receiving, during a discontinuous reception (DRX) cycle, a first plurality of synchronization signal blocks (SSBs) that respectively correspond to a plurality of beams of a base station; selecting a first beam of the plurality of beams based on a first measurement that corresponds to a first SSB of the first plurality of SSBs, the first SSB received on the first beam; comparing the first measurement to a measurement threshold; and scheduling, based on said comparing, either (i) a second measurement that corresponds to a second SSB to be received on the first beam, or (ii) an SSB search and measurement per beam of the plurality of beams.

Example 2 includes the method of example 1, wherein, upon said comparing indicating that the first measurement exceeds the measurement threshold, the second measurement is scheduled and, otherwise, the SSB search and measurement per beam is scheduled.

Example 3 includes the method of example 2, the first measurement comprises at least one of: a signal-to-interference and noise ratio (SINR) measurement, a reference signal received power (RSRP) measurement, or a reference signal received quality (RSRQ).

Example 4 includes the method of any preceding example, further comprising: upon scheduling the SSB search and measurement, selecting one of the plurality of beams for a measurement comparison to the measurement threshold, wherein the one of the plurality of beams is selected based on measurements that respectively correspond to a second plurality of SSBs received on the plurality of beams.

Example 5 includes the method of example 4, wherein the one of the plurality of beams is a second beam and selected based on a determination that the second beam has the largest signal-to-interference and noise ratio (SINR) measurement, reference signal received power (RSRP) measurement, or reference signal received quality (RSRQ) among the plurality of beams.

Example 6 includes the method of any preceding example, further comprising: determining whether, during the DRX cycle, an intra-frequency neighbor cell search and measurement is to be performed, wherein said comparing and said scheduling are based on a determination that the intra-frequency neighbor cell search and measurement is not to be performed during the DRX cycle.

Example 7 includes the method of any preceding example, wherein the SSB search and measurement is a first SSB search and measurement in a first cell, and wherein the method further comprises: upon said comparing indicating that the first measurement is smaller than the measurement threshold, determining that, during the DRX cycle, an intra-frequency neighbor cell search and measurement is to be performed; and scheduling, along with the first SSB search and measurement, a second SSB search and measurement per beam in an intra-frequency neighbor cell.

Example 8 includes the method of example 7, further comprising: selecting, based on SSB measurements, one of the plurality of beams or a second beam associated with the intra-frequency neighbor cell for a next measurement comparison to the measurement threshold.

Example 9 includes the method of any preceding example, wherein the comparing of the first measurement to a measurement threshold is based on a determination that an intra-frequency neighbor cell search and measurement is not to be performed.

Example 10 includes the method of any preceding example, wherein the measurement threshold is a first measurement threshold, wherein the SSB search and measurement is a first SSB search and measurement in a first cell, and wherein the method further comprises: upon said comparing indicating that the first measurement is smaller than the first measurement threshold, determining whether the first measurement is smaller than a second threshold measurement.

Example 11 includes the method of example 10, further comprising: upon determining that the first measurement exceeds the second threshold measurement, scheduling the first SSB search and measurement.

Example 12 includes the method of example 10, further comprising: upon determining that the first measurement is smaller than the second threshold measurement, determining whether, during the DRX cycle, an intra-frequency neighbor cell search and measurement is to be performed.

Example 13 includes the method of example 12, further comprising: upon determining that, during the DRX cycle, the intra-frequency neighbor cell search and measurement is to be performed, scheduling, along with the first SSB search and measurement, a second SSB search and measurement per beam in an intra-frequency neighbor cell.

Example 14 includes a UE comprising means to perform one or more elements of a method described in or related to any of the examples 1-13.

Example 15 includes one or more non-transitory computer-readable media comprising instructions to cause a UE, upon execution of the instructions by one or more processors of the UE, to perform one or more elements of a method described in or related to any of the examples 1-13.

Example 16 includes a UE comprising logic, modules, or circuitry to perform one or more elements of a method described in or related to any of the examples 1-13.

Example 17 includes a UE comprising: one or more processors and one or more computer-readable media comprising instructions that, when executed by the one or more processors, cause the one or more processors to perform one or more elements of a method described in or related to any of the examples 1-13.

Example 18 includes a system comprising means to perform one or more elements of a method described in or related to any of the examples 1-13.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method comprising:
processing a first plurality of synchronization signal blocks (SSBs) that respectively correspond to a plurality of beams of a base station, the first plurality of SSBs received during a discontinuous reception (DRX) cycle;
selecting a first beam of the plurality of beams based on a first measurement that corresponds to a first SSB of the first plurality of SSBs, the first SSB received on the first beam;
determining whether an intra-frequency neighbor cell search and measurement is to be performed;
comparing, based on a determination that the intra-frequency neighbor cell search and measurement is not to be performed, the first measurement to a measurement threshold; and
scheduling, based on said comparing, an SSB search and measurement per beam of the plurality of beams.

2. The method of claim 1, wherein, upon said comparing indicating that the first measurement is smaller than the measurement threshold the SSB search and measurement per beam is scheduled.

3. The method of claim 2, wherein the first measurement comprises at least one of: a signal-to-interference and noise ratio (SINR) measurement, a reference signal received power (RSRP) measurement, or a reference signal received quality (RSRQ).

4. The method of claim 1, further comprising:
upon scheduling the SSB search and measurement, selecting one of the plurality of beams for a measurement comparison to the measurement threshold, wherein the one of the plurality of beams is selected based on measurements that respectively correspond to a second plurality of SSBs received on the plurality of beams.

5. The method of claim 4, wherein the one of the plurality of beams is a second beam and selected based on a determination that the second beam has the largest signal-to-interference and noise ratio (SINR) measurement, reference signal received power (RSRP) measurement, or reference signal received quality (RSRQ) among the plurality of beams.

6. The method of claim 1, further comprising:
determining whether, during the DRX cycle, an intra-frequency neighbor cell search and measurement is to be performed, wherein said comparing and said scheduling are based on a determination that the intra-frequency neighbor cell search and measurement is not to be performed during the DRX cycle.

7. The method of claim 1, wherein the SSB search and measurement is a first SSB search and measurement in a first cell, and wherein the method further comprises:
upon a second measurement being smaller than the measurement threshold, determining that, during another DRX cycle, the intra-frequency neighbor cell search and measurement is to be performed; and
scheduling, along with the first SSB search and measurement, a second SSB search and measurement per beam in an intra-frequency neighbor cell.

8. The method of claim 7, further comprising:
selecting, based on SSB measurements, one of the plurality of beams or a second beam associated with the intra-frequency neighbor cell for a next measurement comparison to the measurement threshold.

9. The method of claim 1, wherein the SSB search and measurement per beam of the plurality of beams is scheduled upon said comparing indicating that the first measurement is smaller than the measurement threshold.

10. The method of claim 1, wherein the measurement threshold is a first measurement threshold, wherein the SSB search and measurement is a first SSB search and measurement in a first cell, and wherein the method further comprises:
upon said comparing indicating that the first measurement is smaller than the first measurement threshold, determining whether the first measurement is smaller than a second threshold measurement.

11. The method of claim 10, further comprising:
upon determining that the first measurement exceeds the second threshold measurement, scheduling the first SSB search and measurement.

12. The method of claim 10, further comprising:
upon determining that the first measurement is smaller than the second threshold measurement, determining whether, during the DRX cycle, the intra-frequency neighbor cell search and measurement is to be performed.

13. The method of claim 12, further comprising:
upon determining that, during the DRX cycle, the intra-frequency neighbor cell search and measurement is to be performed, scheduling, along with the first SSB search and measurement, a second SSB search and measurement per beam in an intra-frequency neighbor cell.

14. An apparatus comprising:
processing circuitry configured to:
process a first plurality of synchronization signal blocks (SSBs) that respectively correspond to a plurality of beams of a base station, the first plurality of SSBs received during a discontinuous reception (DRX) cycle;
select a first beam of the plurality of beams based on a first measurement that corresponds to a first SSB of the first plurality of SSBs, the first SSB received on the first beam;
determine whether an intra-frequency neighbor cell search and measurement is to be performed;
compare, based on a determination that the intra-frequency neighbor cell search and measurement is not to be performed, the first measurement to a measurement threshold; and schedule, based on said comparing, an SSB search and measurement per beam of the plurality of beams.

15. The apparatus of claim 14, wherein, upon said comparing indicating that the first measurement is smaller than the measurement threshold the SSB search and measurement per beam is scheduled.

16. The apparatus of claim 15, wherein the first measurement comprises at least one of a signal-to-interference and noise ratio (SINR) measurement, a reference signal received power (RSRP) measurement, or a reference signal received quality (RSRQ).

17. One or more non-transitory computer-readable storage media storing instructions that, upon execution, cause operations comprising:

processing a first plurality of synchronization signal blocks (SSBs) that respectively correspond to a plurality of beams of a base station, the first plurality of SSBs received during a discontinuous reception (DRX) cycle;

selecting a first beam of the plurality of beams based on a first measurement that corresponds to a first SSB of the first plurality of SSBs, the first SSB received on the first beam;

determining whether an intra-frequency neighbor cell search and measurement is to be performed;

comparing, based on a determination that the intra-frequency neighbor cell search and measurement is not to be performed, the first measurement to a measurement threshold; and scheduling, based on said comparing, an SSB search and measurement per beam of the plurality of beams.

18. The one or more non-transitory computer-readable storage media of claim 17, wherein the operations further comprise:

upon scheduling the SSB search and measurement, selecting one of the plurality of beams for a next measurement comparison to the measurement threshold, wherein the one of the plurality of beams is selected based on measurements that respectively correspond to a second plurality of SSBs received on the plurality of beams.

19. The one or more non-transitory computer-readable storage media of claim 18, wherein the one of the plurality of beams is a second beam and selected based on a determination that the second beam has the largest signal-to-interference and noise ratio (SINR) measurement, reference signal received power (RSRP) measurement, or reference signal received quality (RSRQ) among the plurality of beams.

20. The one or more non-transitory computer-readable storage media of claim 17, wherein said scheduling is based on a determination that the intra-frequency neighbor cell search and measurement is not to be performed during the DRX cycle.

* * * * *